US012614665B2

(12) United States Patent
Mohajeri et al.

(10) Patent No.: US 12,614,665 B2
(45) Date of Patent: Apr. 28, 2026

(54) METHOD OF FABRICATING A HIGH-TEMPERATURE BOBBIN FOR ELECTRICAL DEVICE

(71) Applicant: HONEYWELL INTERNATIONAL INC., Charlotte, NC (US)

(72) Inventors: Mahdi Mohajeri, Morris Plains, NJ (US); Eric Passman, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 599 days.

(21) Appl. No.: 18/159,245

(22) Filed: Jan. 25, 2023

(65) Prior Publication Data

US 2024/0249878 A1 Jul. 25, 2024

(51) Int. Cl.

| | |
|---|---|
| ***H01F 7/06*** | (2006.01) |
| ***H01F 41/064*** | (2016.01) |
| ***H01F 41/098*** | (2016.01) |
| ***H01F 41/12*** | (2006.01) |

(52) U.S. Cl.

CPC ......... *H01F 41/098* (2016.01); *H01F 41/064* (2016.01); *H01F 41/125* (2013.01)

(58) Field of Classification Search

CPC ........ H01F 5/02; H01F 41/005; H01F 41/098; H01F 41/064; H01F 41/125; H01F 7/081

See application file for complete search history.

(56) References Cited

U.S. PATENT DOCUMENTS

| | | | | |
|---|---|---|---|---|
| 6,596,393 | B1 * | 7/2003 | Houston | C23F 11/161 174/109 |
| 10,249,425 | B2 | 4/2019 | Kobayashi | |
| 10,431,362 | B1 * | 10/2019 | Hazzard | C09D 5/08 |
| 11,335,497 | B2 | 5/2022 | Elliott | |
| 2013/0021125 | A1 | 1/2013 | Piascik et al. | |
| 2018/0053595 | A1 | 2/2018 | Elliott | |
| 2019/0066913 | A1 | 2/2019 | Kluesener et al. | |

FOREIGN PATENT DOCUMENTS

| | | |
|---|---|---|
| CN | 205542229 U | 8/2016 |
| CN | 208767058 U | 4/2019 |
| CN | 110371793 A | 10/2019 |
| CN | 111524693 A | 8/2020 |
| CN | 109427458 B | 2/2022 |

* cited by examiner

*Primary Examiner* — Paul D Kim

(74) *Attorney, Agent, or Firm* — Ingrassia Fisher & Lorenz LLP

(57) ABSTRACT

A method of fabricating a high-temperature bobbin for a solenoid or other electrical assembly includes the step of providing a bobbin configured for use in the assembly. The bobbin is coated with an anti-oxidation composition and an anti-corrosion composition to produce an oxidation/corrosion resistant bobbin. The oxidation/corrosion resistant bobbin is coated with an electrical insulating composition that is resistant to corona discharge at or below a predetermined voltage threshold to produce an insulated and oxidation/corrosion resistant bobbin. The anti-oxidation composition, the anti-corrosion composition, and the electrical insulating composition can withstand temperatures of subzero up to temperature greater than 1000° F.

10 Claims, 6 Drawing Sheets

METHOD OF FABRICATING A HIGH-TEMPERATURE BOBBIN FOR ELECTRICAL DEVICE

TECHNICAL FIELD

The present disclosure relates to electrical devices and, more particularly, relates to high-temperature electrical devices and methods of making the same.

BACKGROUND

Solenoid devices are electromechanical devices that convert electrical energy into linear mechanical movement. Solenoid devices are used in myriad environments and for many applications, and typically include at least a coil, a bobbin, a housing, and a movable armature. When the coil is energized, a magnetic field is generated that exerts a force on the movable armature, moving it to a desired position.

Existing solenoid devices have limited operating temperatures, due to the use of organic insulation materials, and thus may exhibit premature failure due to material degradation (i.e., oxidation, corrosion, etc.) of various components that may occur at relatively high temperatures (e.g., approximately 550° F., depending on atmospheric conditions). These relatively high temperatures can be caused by the ambient conditions of the environment in which the solenoid device is installed, or the heat generated while the coil is being energized during a hold period, or a mixture of both. Such high temperatures can adversely impact lifetime, accuracy, and reliability. Thus, in some instances cooling systems may be used to cool the devices.

Hence, there is a need to provide solenoid devices that can operate at relatively high temperatures (e.g. >750° F., specifically ≥1000° F.) by, among other things, prohibiting oxidation and corrosion of the metallic components of solenoid device, prohibiting degradation of the coil materials, and improving the reliability of the magnetic components in the whole assembly level. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method of fabricating a high-temperature bobbin for a solenoid assembly includes the step of providing a bobbin configured for use in the solenoid assembly. The bobbin is coated with an anti-oxidation composition and an anti-corrosion composition to produce an oxidation/corrosion resistant bobbin. The oxidation/corrosion resistant bobbin is coated with an electrical insulating composition that is resistant to corona discharge at or below a predetermined voltage threshold to produce an insulated and oxidation/corrosion resistant bobbin. The anti-oxidation composition, the anti-corrosion composition, and the electrical insulating composition can withstand temperatures of subzero up to temperature greater than 1000° F.

In another embodiment, a method of fabricating a high-temperature bobbin for electrical device includes providing a bobbin configured for use in the electrical device. The bobbin is coated with an anti-oxidation composition and an anti-corrosion composition to produce an oxidation/corrosion resistant bobbin. The oxidation/corrosion resistant bobbin is coated with an electrical insulating composition that is resistant to corona discharge at or below a predetermined voltage threshold to produce an insulated and oxidation/corrosion resistant bobbin. The anti-oxidation composition, the anti-corrosion composition, and the electrical insulating composition can withstand temperatures of subzero up to temperature greater than 1000° F.

Furthermore, other desirable features and characteristics of the bobbin and electrical device and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
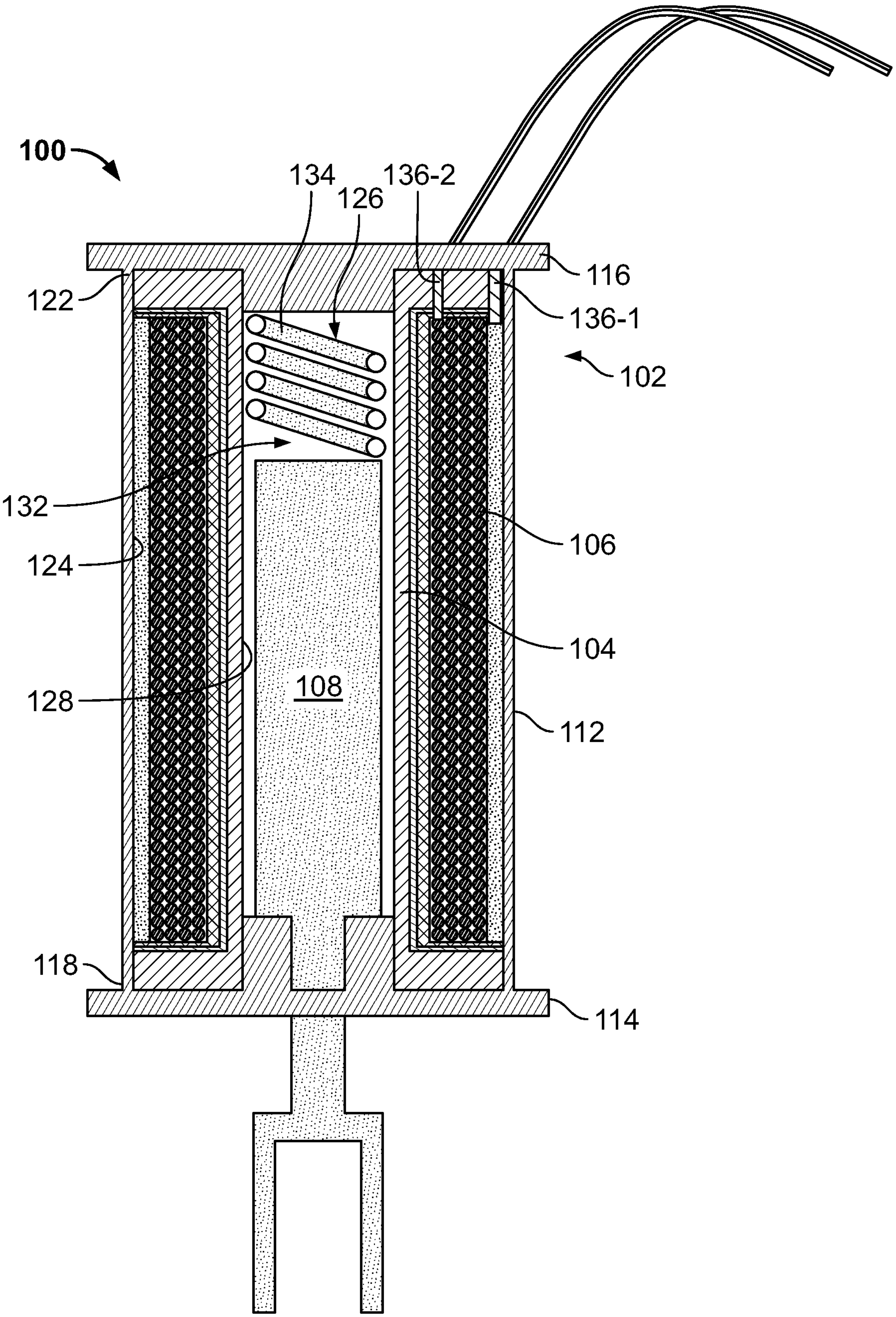
FIG. 1 depicts a simplified cross section view of one exemplary embodiment of a solenoid device.

Referring to FIG. 1, a simplified cross section view of one exemplary embodiment of a solenoid device 100 is depicted. The solenoid device 100 includes at least a housing assembly 102, a bobbin 104, a coil 106, and an armature 108. The housing assembly 102 includes a housing 112, a front cover plate 114, and a back cover plate 116. The housing 112 is configured to include a housing first end 118, a housing second end 122, and an inner surface 124 that defines a housing cavity 126. The housing 112 may comprise any one of numerous materials having a relatively high magnetic permeability such as, for example, magnetic steel. The housing 112, in addition to having a plurality of components disposed therein, provides a flux path, together with the bobbin assembly 104, for magnetic flux that the coil 106 generates when it is electrically energized. The front cover plate 114 is coupled to the housing first end 118 and the back cover plate 116 is coupled to the housing second end 122.

The front and back covers 114, 116 may also preferably comprise any one of numerous materials having a relatively high magnetic permeability.

The bobbin 104 is disposed within the housing cavity 126 and fixedly coupled to the housing 112. The bobbin 104 preferably comprises a material having a relatively high magnetic permeability and, as will be described in more detail below, is coated with an anti-oxidation and anti-corrosion composition, and an electrical insulating composition. The bobbin 104, together with the housing 112 and the armature 108, provides a magnetic flux path for the magnetic flux that is generated when the coil 106 is energized.

The coil 106 is disposed within the housing 112 and is adapted to be electrically energized from a non-illustrated electrical power source. As noted above, when energized, the coil 106 generates magnetic flux. As depicted, the coil 106 is wound around a portion of the bobbin 104, and comprises a high-temperature insulated magnet wire. Although one coil 106 is depicted in FIG. 1, it will be appreciated that the solenoid device 100 could be configured with more than this number of coils, if needed or desired. It will be appreciated that the high-temperature insulated magnet wire may be any one of numerous known types of high-temperature insulated magnet wire. Some non-limiting examples include, but are not limited to, the high-temperature insulated magnet wire disclosed in U.S. Pat. No. 8,484,831, the high-temperature insulated magnet wire disclosed in U.S. Pat. No. 11,437,188, the high-temperature insulated magnet wire disclosed in U.S. Pat. No. 7,795,538, or the high-temperature insulated magnet wire disclosed in U.S. patent application Ser. No. 17/651,092, all of which are assigned to the Assignee of the instant application.

The armature 108 is disposed (at least partially) within the housing assembly 102. More specifically, the bobbin 104 has an inner surface 128 that defines an armature cavity 132. The armature 108 is disposed (at least partially) within the armature cavity 132 and is axially movable relative to the bobbin 104. The armature 108 preferably comprises a material having a relatively high magnetic permeability. As noted previously, the armature 108, together with the housing 112, and the bobbin 104, provides a magnetic flux path for the magnetic flux that is generated by the coil 106 when it is energized. This results in axial movement of the armature 108 within the housing 112 between a first position (depicted in FIG. 1) and a second position (not depicted).

The solenoid device 100 depicted in FIG. 1 additionally includes a bias spring 134 and a plurality of feedthroughs 136 (136-1, 136-2). The bias spring 134, which may be variously implemented, is disposed within the armature cavity 132 and engages the housing 112 (more specifically, the back cover 116) and the armature 108. The bias spring 134, at least in the depicted embodiment, is configured to supply a bias force that urges the armature 108 toward the first position. It will be appreciated, however, that in other embodiments, the spring 134 could be disposed such that it supplies a bias force that urges the armature 108 toward the second position.

The feedthroughs 136 are preferably formed of a ceramic material and are bonded to the bobbin 104. More specifically, each feedthrough 136 extends through, and are bonded in, a separate opening 138 formed in the bobbin 104. A portion of the high-temperature insulated magnet wire extends through each of the feedthroughs 136 for connection to a non-illustrated external power source. In some embodiments, a joint can be made between the high-temperature magnet wire and lead wires (not separately depicted) inside the housing 112 before being passed through the feedthroughs 136. Moreover, in some alternative embodiments, the feedthroughs 136 may be configured to allow the high-temperature magnet wire-to-lead wire joint to be made inside the feedthroughs 136.

The depicted solenoid device 100 is able to withstand temperatures of subzero up to temperatures that exceed 1000° F. This, in part, is due to the process that is used to fabricate the bobbin 104 and then assemble the solenoid device 100. With reference now to FIGS. 2-5, this process will now be described in more detail.

Figure 2:
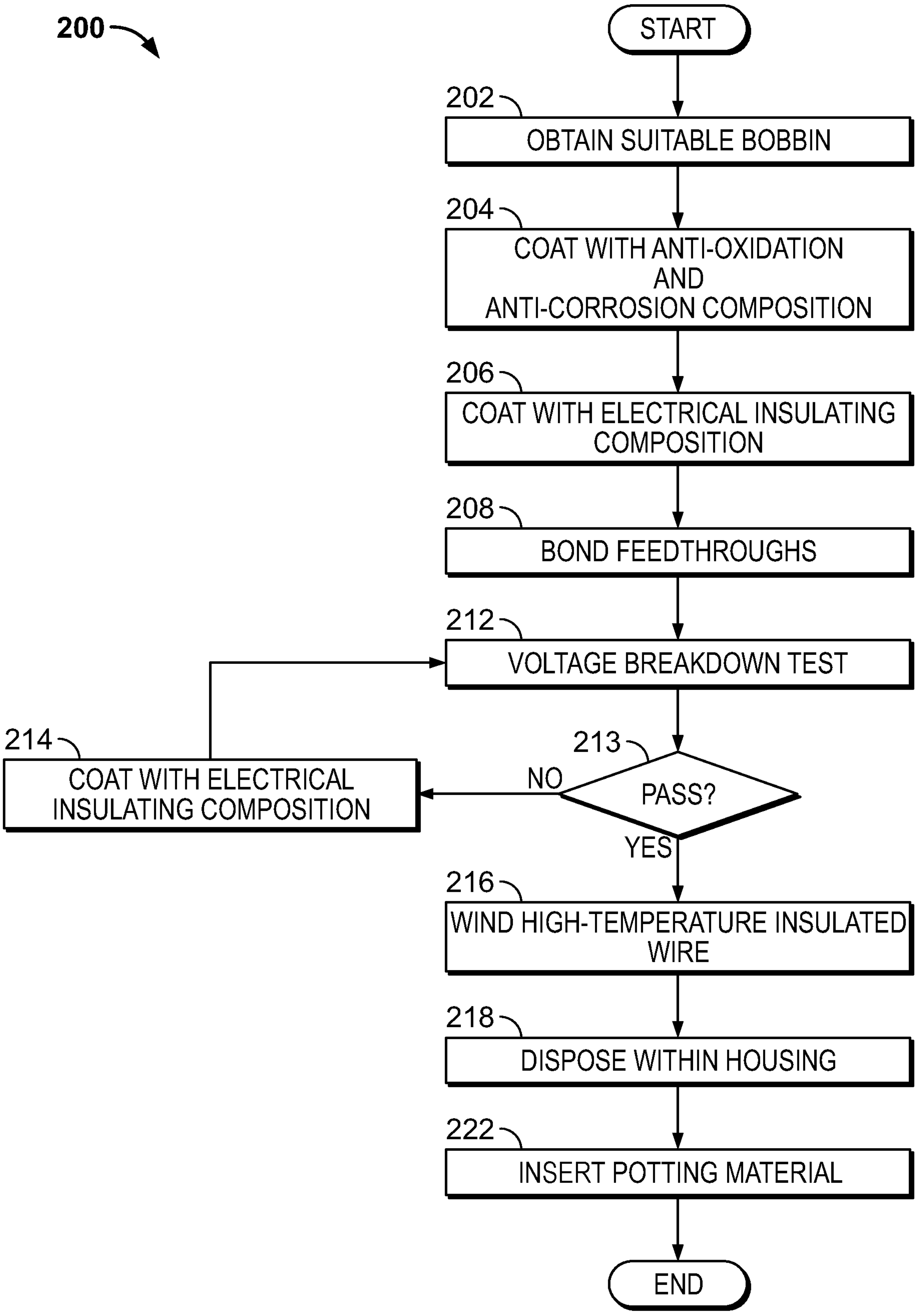
FIG. 2 depicts an embodiment of a process, in flowchart form, that is used to fabricate the bobbin used in the solenoid device of FIG. 1 and to assemble the solenoid device.
Figure 3:
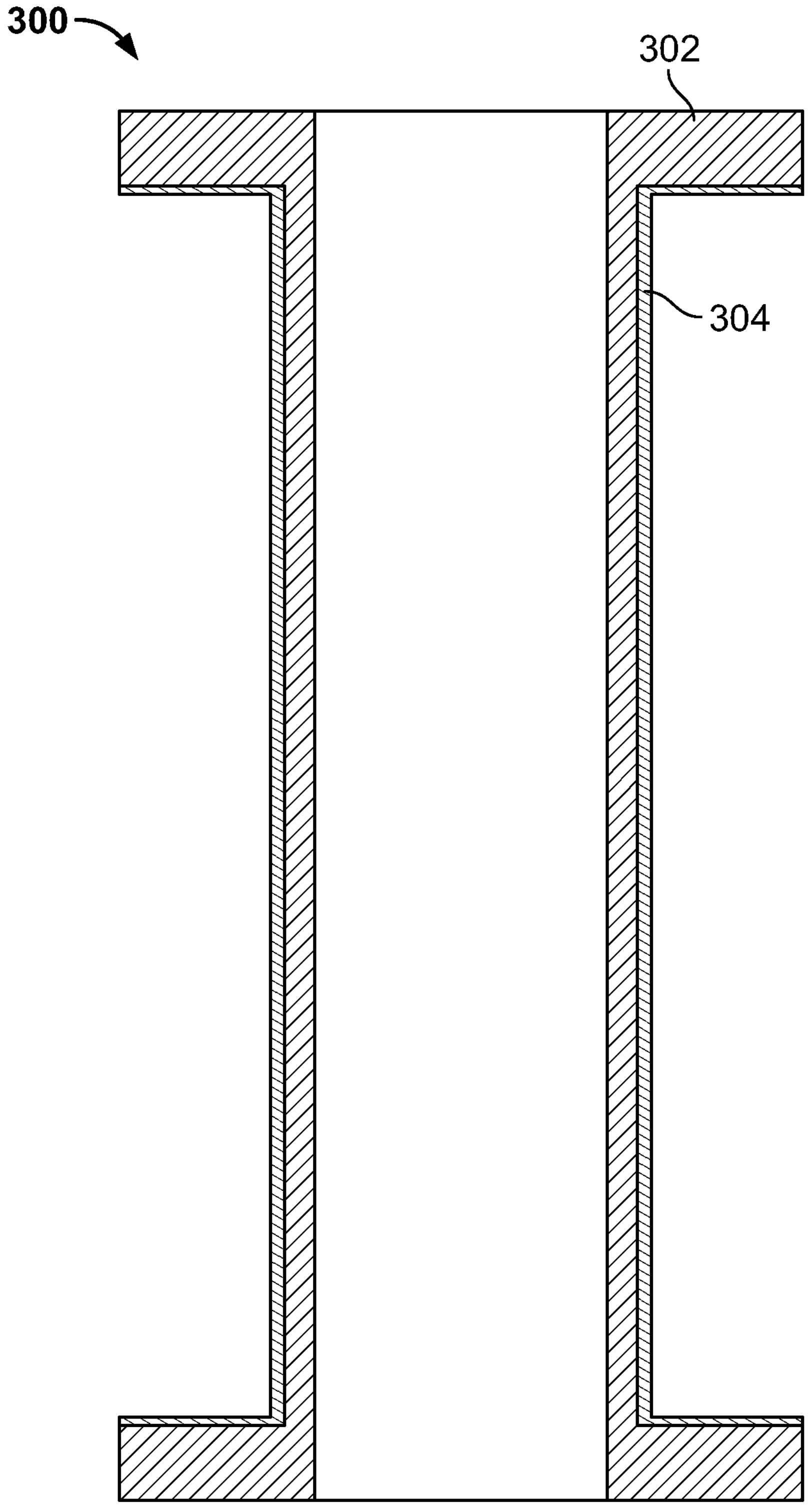
FIG. 3 depicts one embodiment of an oxidation/corrosion resistant bobbin.
Figure 4:
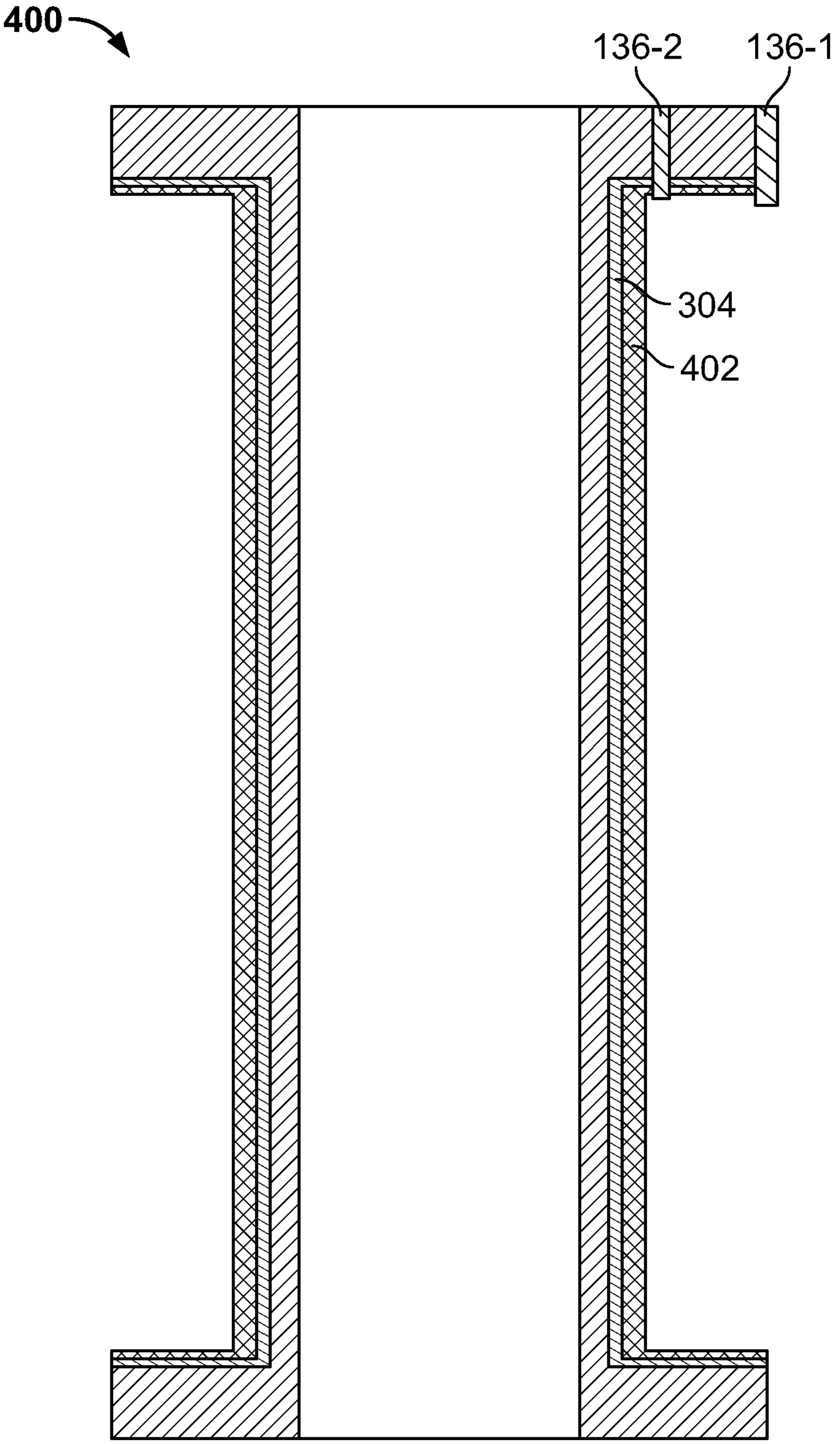
FIG. 4 depicts one embodiment of an insulated and oxidation/corrosion resistant bobbin.

As depicted in flowchart form in FIG. 2, the process 200 begins by obtaining a suitable bobbin (202). An oxidation/corrosion resistant bobbin 300 (see FIG. 3) is then produced by coating the bobbin 302 with an anti-oxidation and anti-corrosion composition 304 (204). The specific anti-oxidation and anti-corrosion composition 304 may vary, and may be implemented using a single composition or plural compositions, but in each case the selected composition(s) can withstand temperatures of subzero up to temperature greater than 1000° F. and may also impart electrical insulation properties. Some non-limiting examples of suitable anti-oxidation and anti-corrosion compositions 304 include Bismuth Oxide, Boron Oxide, Zinc Oxide, ternary glass, silicate, or borate glasses, just to name a few.

As may be appreciated, at least in some embodiments, some additional processing steps, such as drying and/or firing in a furnace, may be implemented to produce the oxidation/corrosion resistant bobbin 300. The specific number and type of additional processing steps may depend, for example, on the specific anti-oxidation and anti-corrosion composition 304 that is used. In one particular example, the additional processing steps drying the coated bobbin in an oven at a temperature around 120° C. In some embodiments, heating to an intermediate temperature of 80° C. may be required. After drying, the bobbin is then heated to about 300° C. to eliminate organics and the vehicle (depending on the composition), and then heating the bobbin to the desired processing condition of the coating (approximately 600-850° C.). This latter step may require a specialized atmosphere (e.g., nitrogen, argon, etc).

No matter the particular additional processing steps, thereafter an insulated and oxidation/corrosion resistant bobbin 400 is produced by coating the oxidation/corrosion resistant bobbin 300 with an electrical insulating composition 402 (206). The specific electrical insulating composition 402 may vary, but the selected composition is resistant to corona discharge at or below a predetermined breakdown voltage threshold ($V_B$). Some non-limiting examples of suitable electrical insulating compositions 402 include Bismuth Oxide, Boron Oxide, Zinc Oxide, ternary glass, silicate, or borate glasses, just to name a few. Additionally, the predetermined voltage threshold may vary, but it is preferably based on the equation $V_B=2*V_a+1500$, where $V_a$ is the expected applied voltage in the system. It is noted that the value of 1500V is generally added since it is the minimum for lightning strike resistance. The electrical insulation thickness can vary depending on the breakdown voltage requirements of the device. Moreover, just like the anti-oxidation composition and the anti-corrosion composition, the electrical insulating composition can also withstand temperatures of subzero up to temperature greater than 1000° F.

As may be appreciated, at least in some embodiments, some additional processing steps, may be implemented to produce the insulated and oxidation/corrosion resistant bobbin 400. The specific number and type of additional processing steps may depend, for example, on the specific electrical insulating composition 402 that is used. In one particular example, the additional processing steps heating the bobbin to approximately 600-850° C., depending on the specific composition. This step may require a specialized atmospheres (e.g., nitrogen, argon, etc).

After the insulated and oxidation/corrosion resistant bobbin 400 is produced, the feedthroughs 136 are disposed within a separate one of the openings 138 formed in the bobbin 104 and are bonded thereto (208). As noted above, the feedthroughs 136 are preferably formed of a ceramic material such as, for example, alumina, Macor®, Zirconia, quartz, glasses, and glass-metal, just to name a few. The feedthroughs 136 are preferably bonded via a metal bonding using the same materials as the anti-oxidation and anti-corrosion composition 304, the electrical insulating composition 402, various cements, and/or various geopolymers.

As FIG. 2 also depicts, after the feedthroughs 136 are bonded to the bobbin 104, the insulated and oxidation/corrosion resistant bobbin 400 preferably undergoes a voltage breakdown test (212). The voltage breakdown test ensures that the insulated and oxidation/corrosion resistant bobbin 400 can withstand the above-described breakdown voltage ($V_B$), which may or may not include the 1500V lightning strike margin, depending on the end-use environment. If the insulated and oxidation/corrosion resistant bobbin 400 does not pass the voltage breakdown test (213), additional electrical insulating composition 402 is applied (214) and the voltage breakdown test (212) is run again. These steps are repeated until the insulated and oxidation/corrosion resistant bobbin 400 passes the voltage breakdown test (213).

Figure 5:
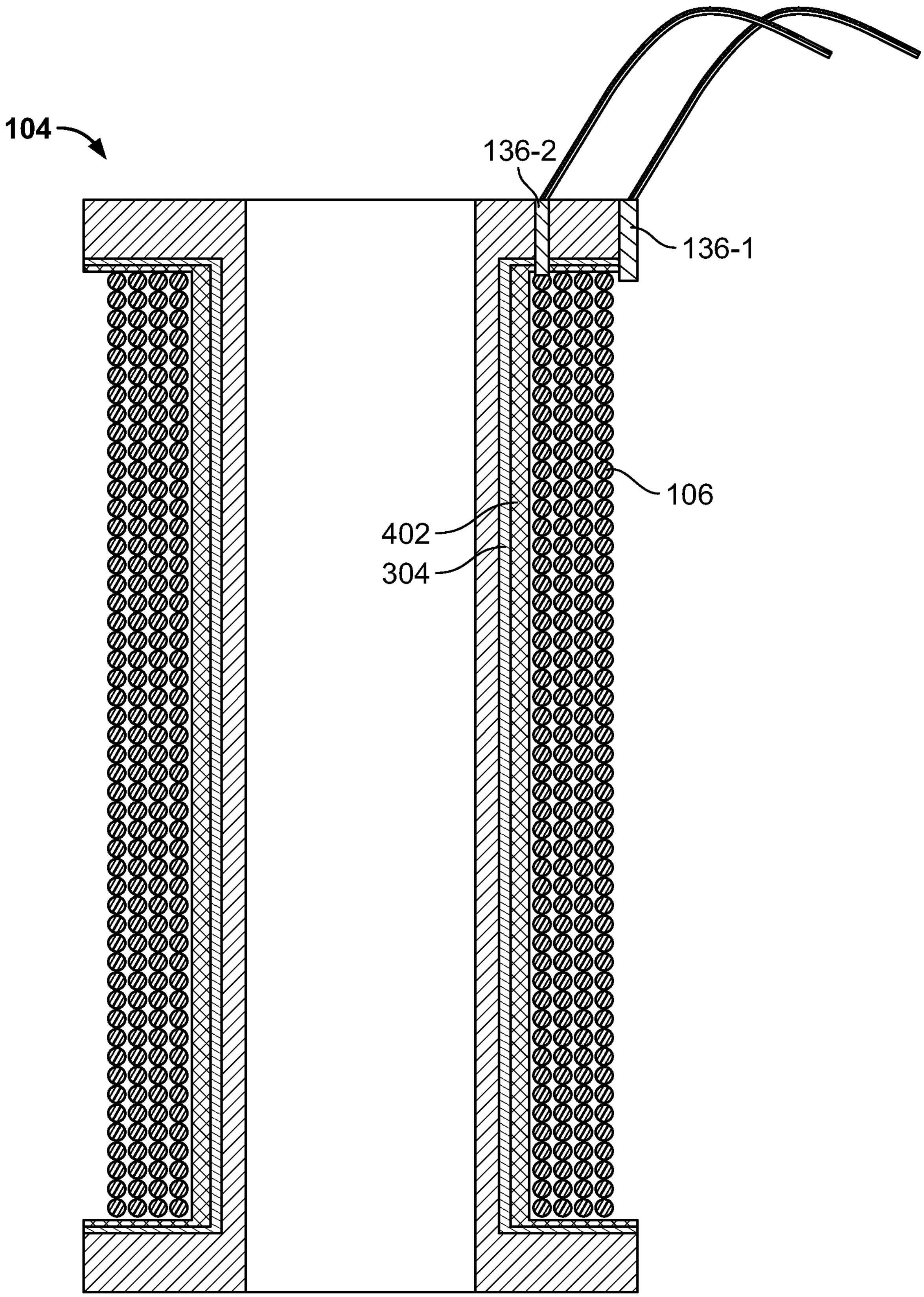
FIG. 5 depicts one embodiment of high-temperature bobbin.
Figure 6:
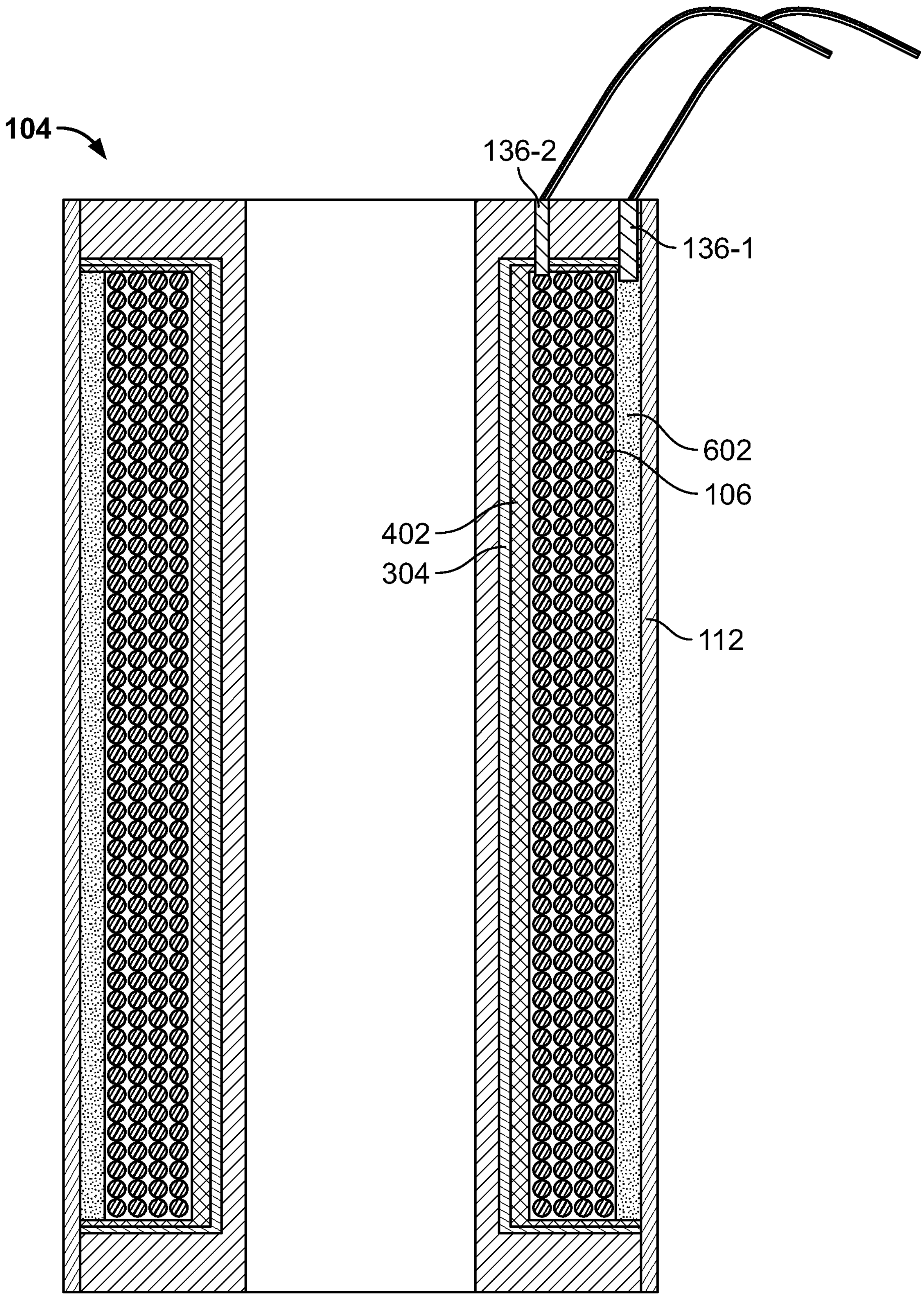
FIG. 6 depicts the insulated and oxidation/corrosion resistant bobbin of FIG. 4 installed within a housing and at least partially surrounded by a potting material.

After passing the voltage breakdown test, and as depicted in FIG. 5, the high-temperature insulated wire 106 is wound onto the insulated and oxidation/corrosion resistant bobbin 400 and a portion of the high-temperature insulated wire is passed through each of the ceramic feedthroughs 136 to thereby produce the high-temperature bobbin 104 (216). The high-temperature bobbin 104 is then disposed within housing 112 (218), and a potting material 602 (see FIG. 6), such as a high-temperature geopolymer potting material, is then injected into the housing 112 (222) such that the potting material 602 surrounds at least a portion of the high-temperature bobbin 104. The potting material 602 may then be processed, either before or after the armature 108 are bias spring 134 installed, and the front and back cover plates 114, 116 are coupled to the housing first and second ends 118, 122. It will be appreciated that if, as noted above, the magnet wire-to-lead wire joint is inside the housing 112, then the injected potting material 602 also surrounds the joint.

Some examples of suitable high-temperature geopolymer potting materials include, for example, various sodium-silicates, various alumino-silicates, and various magnesia-silicates. The assembly may then undergo additional/final thermal processing to allow the high-temperature geopolymer potting material to dry/cure. This processing may entail, for example, placing the assembly in an oven/furnace and raising the temperature directly to the desired temperature-typically just above the expected maximum operating temperature of the device. For example, if the desired operating temperature of the device is 750° F., the oven/furnace temperature may be set to 800° F., and allowed to soak overnight.

It will be appreciated that although the various compositions mentioned above were described as being applied to the bobbin 104, it will be appreciated that, at least in some embodiments, these compositions may also be applied to one or more of the armature 108, the housing 112, and/or the front and back cover plates 114, 116. It will additionally be appreciated that the processing steps described herein may also be used with other similar devices, such as a linear variable differential transformer (LVDT) sensor.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of fabricating a high-temperature bobbin for a solenoid assembly, comprising the steps of:
- providing a bobbin configured for use in the solenoid assembly;
- coating the bobbin with an anti-oxidation composition and an anti-corrosion composition to produce an oxidation/corrosion resistant bobbin; and
- coating the oxidation/corrosion resistant bobbin with an electrical insulating composition that is resistant to corona discharge at or below a predetermined voltage threshold to produce an insulated oxidation/corrosion resistant bobbin,
- wherein the anti-oxidation composition, the anti-corrosion composition, and the electrical insulating composition can withstand temperatures of subzero up to temperatures greater than 1000° F.

2. The method of claim 1, further comprising:
- bonding a plurality of ceramic feedthroughs to a portion of the insulated oxidation/corrosion resistant bobbin.

3. The method of claim 2, further comprising:
- winding high-temperature insulated wire onto the insulated and oxidation/corrosion resistant bobbin and extending a portion of the high-temperature insulated wire through the ceramic feedthroughs to thereby produce the high-temperature bobbin.

4. The method of claim 3, further comprising:
- disposing the high-temperature bobbin within a housing; and
- inserting a potting material into the housing such that the potting surrounds at least a portion of the high-temperature bobbin.

5. The method of claim 1, further comprising:
- coating the insulated oxidation/corrosion resistant bobbin with additional electrical insulating composition.

6. A method of fabricating a high-temperature bobbin for electrical device, comprising the steps of:
- providing a bobbin configured for use in the electrical device;
- coating the bobbin with an anti-oxidation composition and an anti-corrosion composition to produce an oxidation/corrosion resistant bobbin; and
- coating the oxidation/corrosion resistant bobbin with an electrical insulating composition that is resistant to corona discharge at or below a predetermined voltage threshold to produce an insulated oxidation/corrosion resistant bobbin,
- wherein the anti-oxidation composition, the anti-corrosion composition, and the electrical insulating composition can withstand temperatures of subzero up to temperatures greater than 1000° F.

7. The method of claim 6, further comprising:
- bonding a plurality of ceramic feedthroughs to a portion of the insulated and oxidation/corrosion resistant bobbin.

8. The method of claim 7, further comprising:
- winding high-temperature insulated wire onto the insulated oxidation/corrosion resistant bobbin and extending a portion of the high-temperature insulated wire through the ceramic feedthroughs to thereby produce the high-temperature bobbin.

9. The method of claim 8, further comprising:
- disposing the high-temperature bobbin within a housing; and
- inserting a potting material into the housing such that the potting surrounds at least a portion of the high-temperature bobbin.

10. The method of claim 6, further comprising:
- coating the insulated oxidation/corrosion resistant bobbin with additional electrical insulating composition.

* * * * *